United States Patent
Kobayashi et al.

(10) Patent No.: US 12,283,436 B2
(45) Date of Patent: Apr. 22, 2025

(54) POWER STORAGE DEVICE, AND METHOD FOR MANUFACTURING POWER STORAGE DEVICE

(71) Applicant: Panasonic Intellectual Property Management Co., Ltd., Osaka (JP)

(72) Inventors: Toshitaka Kobayashi, Shiga Ken (JP); Eiko Ishii, Osaka Fu (JP); Hideki Shimamoto, Kyoto Fu (JP); Ryota Morioka, Kyoto Fu (JP); Hiroki Hayashi, Kyoto Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 234 days.

(21) Appl. No.: 18/250,179

(22) PCT Filed: Oct. 19, 2021

(86) PCT No.: PCT/JP2021/038560
§ 371 (c)(1),
(2) Date: Apr. 21, 2023

(87) PCT Pub. No.: WO2022/091862
PCT Pub. Date: May 5, 2022

(65) Prior Publication Data
US 2023/0395330 A1    Dec. 7, 2023

(30) Foreign Application Priority Data

Oct. 30, 2020 (JP) .................................. 2020-182005
Nov. 20, 2020 (JP) .................................. 2020-193869
Jan. 27, 2021 (JP) .................................. 2021-011259

(51) Int. Cl.
H01G 9/10    (2006.01)
H01G 9/00    (2006.01)
H01G 9/12    (2006.01)

(52) U.S. Cl.
CPC .............. *H01G 9/10* (2013.01); *H01G 9/0029* (2013.01); *H01G 9/12* (2013.01)

(58) Field of Classification Search
CPC .......... H01G 9/10; H01G 9/0029; H01G 9/12; H01G 11/20; H01G 9/145; H01G 11/80;
(Continued)

(56) References Cited

U.S. PATENT DOCUMENTS

2005/0225926 A1   10/2005   Erhardt et al.
2009/0122468 A1    5/2009   Miura et al.
(Continued)

FOREIGN PATENT DOCUMENTS

JP    H01-104651 U1    7/1969
JP    S59-040767 Y2   11/1984
(Continued)

OTHER PUBLICATIONS

International Search Report dated Jan. 18, 2022 issued in International Patent Application No. PCT/JP2021/038560, with English translation.

*Primary Examiner* — Dion R. Ferguson
(74) *Attorney, Agent, or Firm* — Rimon P.C.

(57) ABSTRACT

A disclosed power storage device includes a power storage element, a case with a bottomed cylindrical shape having an opening at one end and housing the power storage element, and a sealing member for sealing the opening. The case has, in a vicinity of the opening, a first pressing portion pressing a side surface of the sealing member and protruding inward of the case, and a gas vent portion disposed nearer to the one end of the case than an apex which is the most protruded (Continued)

point of the first pressing portion. This can provide a power storage device including an explosion-proof mechanism that has high operational reliability and does not impair airtightness.

19 Claims, 8 Drawing Sheets

(58) Field of Classification Search
CPC .......... H01G 11/82; H01G 9/08; Y02E 60/10; H01M 50/183; H01M 50/10; H01M 50/342
See application file for complete search history.

(56) References Cited

U.S. PATENT DOCUMENTS

| | | | |
|---|---|---|---|
| 2023/0395330 A1* | 12/2023 | Kobayashi | ............... H01G 9/12 |
| 2024/0162539 A1* | 5/2024 | Kohira | ................ H01M 50/167 |
| 2024/0170227 A1* | 5/2024 | Kobayashi | .......... H01M 50/342 |

FOREIGN PATENT DOCUMENTS

| | | | | |
|---|---|---|---|---|
| JP | H07-122466 A | | 5/1995 | |
| JP | 2005-520344 A | | 7/2005 | |
| JP | 2006049499 A | * | 2/2006 | |
| JP | 2007-165521 A | | 6/2007 | |
| JP | 2007-189184 A | | 7/2007 | |
| JP | 5179008 B2 | * | 4/2013 | ............. H01G 9/10 |
| JP | 2015056357 A | * | 3/2015 | |
| WO | WO-2013051273 A1 | * | 4/2013 | ............. H01G 11/20 |
| WO | WO-2013073192 A1 | * | 5/2013 | ............. H01G 9/08 |
| WO | WO2022196623 | * | 9/2022 | |
| WO | WO-2024004892 A1 | * | 1/2024 | |

* cited by examiner

POWER STORAGE DEVICE, AND METHOD FOR MANUFACTURING POWER STORAGE DEVICE

CROSS-REFERENCE OF RELATED APPLICATIONS

This application is the U.S. National Phase under 35 U.S.C. § 371 of International Patent Application No. PCT/JP2021/038560, filed on Oct. 19, 2021, which in turn claims the benefit of Japanese Patent Application No. 2020-182005, filed on Oct. 30, 2020, Japanese Patent Application No. 2020-193869, filed on Nov. 20, 2020, and Japanese Patent Application No. 2021-011259, filed on Jan. 27, 2021 the entire disclosures of which Applications are incorporated by reference herein.

TECHNICAL FIELD

The present disclosure relates to a power storage device, and a method for manufacturing a power storage device.

BACKGROUND ART

Conventionally, a power storage device (specifically, an electrolytic capacitor) which includes a power storage element, a case having a bottomed cylindrical shape and housing the power storage element, and a sealing member sealing the opening of the case is known (e.g., Patent Literature 1). In the power storage device of Patent Literature 1, a narrowed portion for compressing the sealing member is formed in a vicinity of the opening in the case, and a hole or slit is disposed in a place where the diameter of the narrowed portion is the smallest. This hole or slit serves as an explosion-proof mechanism to release the gas within the case when the internal pressure of the case is increased.

CITATION LIST

Patent Literature

[PTL 1] Japanese Examined Utility Model Application Publication No. S59-40767

SUMMARY OF INVENTION

Technical Problem

However, the place where the diameter of the narrowed portion is the smallest is most important for the function of compressing the sealing member, i.e., the function of ensuring the airtightness of the power storage device. In Patent Literature 1, in which a hole or slit is disposed in that place, there is a risk that the airtightness of the power storage device is impaired. On the other hand, without some form of explosion-proof mechanism, when the internal pressure of the case is increased, the sealing member may pop out, to cause a short circuit. Under such circumstances, one of the objectives of the present disclosure is to provide a power storage device including an explosion-proof mechanism that has high operational reliability and does not impair the airtightness.

Solution to Problem

One aspect according to the present disclosure relates to a power storage device. The power storage device includes: a power storage element; a case with a bottomed cylindrical shape having an opening at one end and housing the power storage element; and a sealing member for sealing the opening, wherein the case has, in a vicinity of the opening, a first pressing portion pressing a side surface of the sealing member and protruding inward of the case, and a gas vent portion disposed nearer to the one end than an apex which is the most protruded point of the first pressing portion.

Advantageous Effects of Invention

According to the present disclosure, a power storage device including an explosion-proof mechanism that has high operational reliability and does not impair the airtightness can be obtained.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Embodiments of a power storage device, and a method for manufacturing a power storage device according to the present disclosure will be described below by way of examples. It is to be noted, however, that the present disclosure is not limited to the examples described below. In the description below, specific numerical values and materials are exemplified in some cases, but other numerical values and materials may be applied as long as the effects of the present disclosure can be achieved.

The power storage device according to the present disclosure includes a power storage element, a case with a bottomed cylindrical shape having an opening at one end and housing the power storage element, and a sealing member for sealing the opening. The case has, in a vicinity of the opening, a first pressing portion pressing the side surface of the sealing member and protruding inward of the case, and a gas vent portion disposed nearer to the one end than an apex which is the most protruded point of the first pressing portion. The gas vent portion has, for example, a through-hole or a slit. A protrusion protruding inward of the case may be disposed on the periphery of the through-hole. The power storage device according to the present disclosure, for example, has a configuration like those of power storage devices A, B, and C below, but not limited thereto.

(Power Storage Device A)

A power storage device (hereinafter referred to as a power storage device A) according to one embodiment of the present disclosure includes a power storage element, a case, and a sealing member. In the following, these components will be described.

(Power Storage Element)

The power storage element includes an electrode, a liquid electrolyte, and the like. For example, when the power storage device A is an electrolytic capacitor, the power storage element includes a wound body. The wound body is formed by winding a pair of electrodes with a separator therebetween. The pair of electrodes may be a pair of polarizable electrodes, or may be a combination of an anode and a cathode. For example, when the power storage device A is a secondary battery or a lithium ion capacitor, the power storage element includes an electrode group. The electrode group is formed by winding a positive electrode and a negative electrode, with a separator interposed therebetween. The power storage element may further includes a liquid electrolyte or a liquid component.

(Case)

The case is of a bottomed cylindrical shape and has an opening at one end, and houses the power storage element. The case may be constituted of, for example, a metal including aluminum, iron, nickel, and the like. The shape of the case is not particularly limited, but may be, for example, a bottomed cylindrical shape.

(Sealing Member)

The sealing member seals the opening of the case. The sealing member is constituted of an elastic material (e.g., a material including an elastic resin). The shape of the sealing member may be a shape corresponding to that of the case. For example, when the case has a bottomed cylindrical shape, the sealing member may have a circular plate-like shape, and when the case has a bottomed prismatic shape, the sealing member may have a square plate-like shape.

As the elastic resin, a rubber component is desirable. As the rubber component, butyl rubber (IIR), nitrile rubber (NBR), ethylene propylene rubber, ethylene propylene diene rubber (EPDM), chloroprene rubber (CR), isoprene rubber (IR), Hypalon rubber, silicone rubber, fluorocarbon rubber, and the like can be used singly, or in a blend. In particular, butyl rubber, ethylene propylene rubber, fluorocarbon rubber, and the like are desirable. The elastic material may include, in addition to the elastic resin, a filler, a carbon black, a processing aid, a crosslinking aid, and the like, as optional components.

The case has, in a vicinity of the opening, a first pressing portion and a second pressing portion, and a through-hole (a gas vent portion) formed between the first pressing portion and the second pressing portion.

The first pressing portion presses the side surface of the sealing member and protrudes inward of the case. The inner diameter at an apex which is the most protruding point of the first pressing portion may be smaller than the outer diameter of the sealing member with no load applied. The first pressing portion may be formed by, for example, a grooving process for reducing the diameter of part of the opening.

The second pressing portion is disposed nearer to the one end of the case, that is, nearer to the opening end of the case, than the first pressing portion, and presses the rim of the sealing member toward inside of the case. The second pressing portion may be formed by, for example, curling part of the opening near its tip end.

The through-hole is disposed nearer to the one end of the case, that is, nearer to the opening end of the case, than the apex which is the most protruding point of the first pressing portion. The through-hole may be configured to provide communication between the inside and outside of the case, when the force acting on the first pressing portion from the sealing member reduced below a predetermined value due to an increase in the internal pressure of the case. The through-hole may be disposed only on the side nearer to one end of the case than the apex of the first pressing portion. Only one through-hole may be disposed, or two or more through-holes may be disposed.

Here, when the internal pressure of the case is increased, the sealing member expands outward of the case in the axial direction of the case. When this axial expansion occurs, the region of the sealing member where it is in contact with the first pressing portion is displaced in a direction away from the first pressing portion, and this weakens the force acting on the first pressing portion from the sealing member (i.e., elastic repulsive force against compression). When the acting force is reduced below a predetermined value, the gas within the case goes through between the sealing member and the first pressing portion. This gas can escape through the through-hole from the inside of the case to the outside of the case, which reduces the internal pressure of the power storage device A, and thus, the safety is ensured.

The through-hole of the power storage device A of the present disclosure, unlike the hole or slit of the power storage device of Patent Literature 1, is disposed, rather than at the apex of the first pressing portion, nearer to the one end of the case, that is, nearer to the opening end of the case, than the apex. In other words, the through-hole is not disposed at the apex of the first pressing portion, which is an important place in ensuring the airtightness of the power storage device. Therefore, the through-hole does not substantially impair the airtightness of the power storage device A.

As described above, according to one embodiment of the present disclosure, a power storage device A including an explosion-proof mechanism that has high operational reliability and does not impair the airtightness can be provided. Also, according to one embodiment of the present disclosure, by the operation of the explosion-proof mechanism, an unexpected rupture of the power storage device A, such as causing the sealing member and the like to scatter, can be prevented.

The through-hole may be disposed, in the axial direction of the case, closer to the upper surface of the sealing member than a midpoint between the upper surface of the sealing member and the apex which is the most protruded point of the first pressing portion. According to this configuration, the through-hole is positioned sufficiently away from the apex of the first pressing portion. That is, the through-hole is not present at the apex of the first pressing portion and its vicinity. It is therefore possible to make the airtightness of the power storage device A less likely to be impaired.

The through-hole may have a circular or oval shape. According to this configuration, a local concentration of stress around the rim of the through-hole which may occur when the internal pressure of the case is increased can be avoided. Thus, a damage to the case starting from the through-hole is unlikely to occur.

The through-hole may have a polygonal shape. According to this configuration, the through-hole can be easily formed because the through-hole will be formed with a polygonal needle or the like. Examples of the polygonal shape include, but are not limited to, a triangle shape and a square shape.

(Power Storage Device B)

A power storage device according to another embodiment of the present disclosure (hereinafter, a power storage device B) includes a power storage element, a case, and a sealing member. In the following, these components will be described.

(Power Storage Element)

The power storage element may be as described for the power storage device A.

(Case)

The case may be as described for the power storage device A.

(Sealing Member)

The sealing member may be as described for the power storage device A.

The opening of the case has a first pressing portion and a slit (gas vent portion).

The first pressing portion, in the vicinity of the opening, presses the side surface of the sealing member, and protrudes inward of the case. The inner diameter at an apex which is the most protruding point of the first pressing portion may be smaller than the outer diameter of the sealing member with no load applied. The first pressing portion may be formed by, for example, a grooving process for reducing the diameter of part of the opening.

The slit is disposed nearer to the one end of the case, that is, nearer to the opening end of the case, than the apex which is the most protruding point of the first pressing portion. The slit may be configured to provide communication between the inside and outside of the case, when the force acting on the first pressing portion from the sealing member is reduced below a predetermined value due to an increase in the internal pressure of the case. The slit may be disposed only on the side nearer to one end of the case than the apex of the first pressing portion. Only one slit may be disposed, or two or more slits may be disposed.

Here, when the internal pressure of the case is increased, the sealing member expands outward of the case in the axial direction of the case. When this axial expansion occurs, the region of the sealing member where it is in contact with the first pressing portion is displaced in a direction away from the first pressing portion, and this weakens the force acting on the first pressing portion from the sealing member (i.e., elastic repulsive force against compression). When the acting force is reduced below a predetermined value, the gas within the case goes through between the sealing member and the first pressing portion. This gas can escape through the slit from the inside of the case to the outside of the case, which reduces the internal pressure of the power storage device B, and thus, the safety is ensured.

The slit of the power storage device B of the present disclosure, unlike the hole or slit of the power storage device of Patent Literature 1, is disposed, rather than at the apex of the first pressing portion, nearer to the one end of the case, that is, nearer to the opening end of the case, than the apex. In other words, the slit is not disposed at the apex of the first pressing portion, which is an important place in ensuring the airtightness of the power storage device. Therefore, the slit does not substantially impair the airtightness of the power storage device B.

As described above, according to another embodiment of the present disclosure, a power storage device B including an explosion-proof mechanism that has high operational reliability and does not impair the airtightness can be provided. Also, according to another embodiment of the present disclosure, by the operation of the explosion-proof mechanism, an unexpected rupture of the power storage device B, such as causing the sealing member and the like to scatter, can be prevented.

The slit may not be disposed at the apex of the first pressing portion. The slit may not be disposed in the first pressing portion.

The sealing member may be made of an elastic body containing rubber as a main component. The rubber may constitute 50 mass % or more of the elastic body.

The case may further include, in the vicinity of the opening, a second pressing portion pressing an upper surface of the sealing member. This can further enhance the airtightness of the power storage device B.

The slit may extend to the one end of the case. This can ease the formation of the slit.

The tip of the slit may be positioned, in the axial direction of the case, closer to an end surface (upper surface) of the sealing member facing the outside of the case than a midpoint between the end surface of the sealing member and the apex of the first pressing portion. According to this configuration, the tip of the slit is positioned sufficiently away from the apex of the first pressing portion. That is, the slit is not present at the apex of the first pressing portion and its vicinity. It is therefore possible to make the airtightness of the power storage device B less likely to be impaired.

(Power Storage Device C)

A power storage device according to yet another embodiment of the present disclosure (hereinafter, a power storage device C) includes a power storage element, a case, and a sealing member. In the following, these components will be described.

(Power Storage Element)

The power storage element may be as described for the power storage device A.

(Case)

The case may be as described for the power storage device A.

(Sealing Member)

The sealing member may be as described for the power storage device A.

The case has, in a vicinity of the opening, a first pressing portion and a second pressing portion, and a through-hole (a gas vent portion) formed between the first pressing portion and the second pressing portion.

The first pressing portion presses the side surface of the sealing member and protrudes inward of the case. The inner diameter at an apex which is the most protruding point of the first pressing portion may be smaller than the outer diameter of the sealing member with no load applied. The first pressing portion may be formed by, for example, a grooving process for reducing the diameter of part of the opening.

The second pressing portion is disposed nearer to the one end of the case, that is, nearer to the opening end of the case, than the first pressing portion, and presses the rim of the sealing member toward inside of the case. The second pressing portion may be formed, for example, by curling part of the opening near its tip end.

The through-hole is disposed nearer to the one end of the case, that is, nearer to the opening end of the case, than the apex which is the most protruding point of the first pressing portion. The through-hole may be configured to provide communication between the inside and outside of the case, when the force acting on the first pressing portion from the sealing member is reduced below a predetermined value due to an increase in the internal pressure of the case. The through-hole may be disposed only on the side nearer to one end of the case than the apex of the first pressing portion. Only one through-hole may be disposed, or two or more through-holes may be disposed.

Here, when the internal pressure of the case is increased, the sealing member expands outward of the case in the axial direction of the case. When this axial expansion occurs, the region of the sealing member where it is in contact with the first pressing portion is displaced in a direction away from the first pressing portion, and this weakens the force acting on the first pressing portion from the sealing member (i.e., elastic repulsive force against compression). When the acting force is reduced below a predetermined value, the gas within the case goes through between the sealing member and the first pressing portion. This gas can escape through the through-hole from the inside of the case to the outside of the case, which reduces the internal pressure of the power storage device C, and thus, the safety is ensured.

The through-hole of the power storage device C of the present disclosure, unlike the hole or slit of the power storage device of Patent Literature 1, is disposed, rather than at the apex of the first pressing portion, nearer to the one end of the case, that is, nearer to the opening end of the case, than the apex. In other words, the through-hole is not disposed at the apex of the first pressing portion, which is an important place in ensuring the airtightness of the power storage device. Therefore, the through-hole does not substantially impair the airtightness of the power storage device C.

In addition, the power storage device C of the present disclosure has a protrusion protruding inward of the case. The presence of the protrusion prevents the through-hole from being clogged by the sealing member. That is, even when the sealing member is deformed and approaches the through-hole, the protrusion abuts against the side surface of the sealing member, to prevent the through-hole from being completely clogged. Here, the protruding end of the protrusion is not continued over the entire circumference of the through-hole. This ensures communication between the inside and outside of the case through the through-hole even when the sealing member abuts against the protrusion. The through-hole may a polygonal shape (e.g., triangular shape, square shape), and the protrusion may be formed along each side of the polygonal shape. The length of the protrusion may be, for example, 30% or more of the maximum diameter of the through-hole.

(Method for Manufacturing Power Storage Device C)

A method for manufacturing the power storage device C includes a housing step, a sealing preparation step, a sealing completion step, and a piercing step. In the following, these components will be described. The housing step and the sealing preparation step may be performed simultaneously.

In the housing step, the power storage element is housed in the case. For example, when the power storage device C is an electrolytic capacitor, a wound body included in the power storage element is housed in the case such that the axial direction of the wound body substantially coincides with the axial direction of the case.

In the sealing preparation step, a sealing member is disposed at the opening of the case. The sealing member may be disposed in contact with the inner surface of the case, or may be disposed so as not to come in contact with the inner surface of the case.

In the sealing completion step, a first pressing portion and a second pressing portion are formed, thereby to complete the sealing the opening of the case. The first pressing portion may be formed by, for example, a grooving process for reducing the diameter of part of the opening. The second pressing portion may be formed, for example, by curling part of the opening. The first pressing portion and the second pressing portion may be formed in this order, or may be formed substantially simultaneously. Alternatively, the formation of the second pressing portion may be started during the formation of the first pressing portion.

In the piercing step, after the sealing completion step, a through-hole and a protrusion are formed between the first pressing portion and the second pressing portion in the case. In the piercing step, the through-hole may be formed by piercing the case with the tip of a tool with a sharp point (e.g., a needle). The tip of the tool may be polygonal pyramid-shaped. With the tip of the tool being polygonal pyramid-shaped (e.g., triangular pyramid-shaped, quadrangular pyramid-shaped), the protrusion can be stably formed.

As described above, according to the present disclosure, a power storage device C including an explosion-proof mechanism that has high operational reliability and does not impair the airtightness, and its manufacturing method can be provided. Also, according to the present disclosure, by the operation of the explosion-proof mechanism, an unexpected rupture of the power storage device C, such as causing the sealing member and the like to scatter, can be prevented.

In the following, examples of the power storage device and the method for manufacturing a power storage device according to the present disclosure will be specifically described with reference to the drawings. The components and processes as described above can be applied to the components and processes of the below-described examples of the power storage device and the method for manufacturing a power storage device. The components and processes of the below-described examples of the power storage device and the method for manufacturing a power storage device can be modified based on the description above. The matters as described below may be applied to the above embodiments. Of the components and processes of the below-described examples of the power storage device and the method for manufacturing a power storage device, the components and processes which are not essential to the power storage device and the method for manufacturing a power storage device according to the present disclosure may be omitted. The figures below are schematic and not intended to accurately reflect the shape and the number of the actual members.

Embodiment 1

Figure 1:
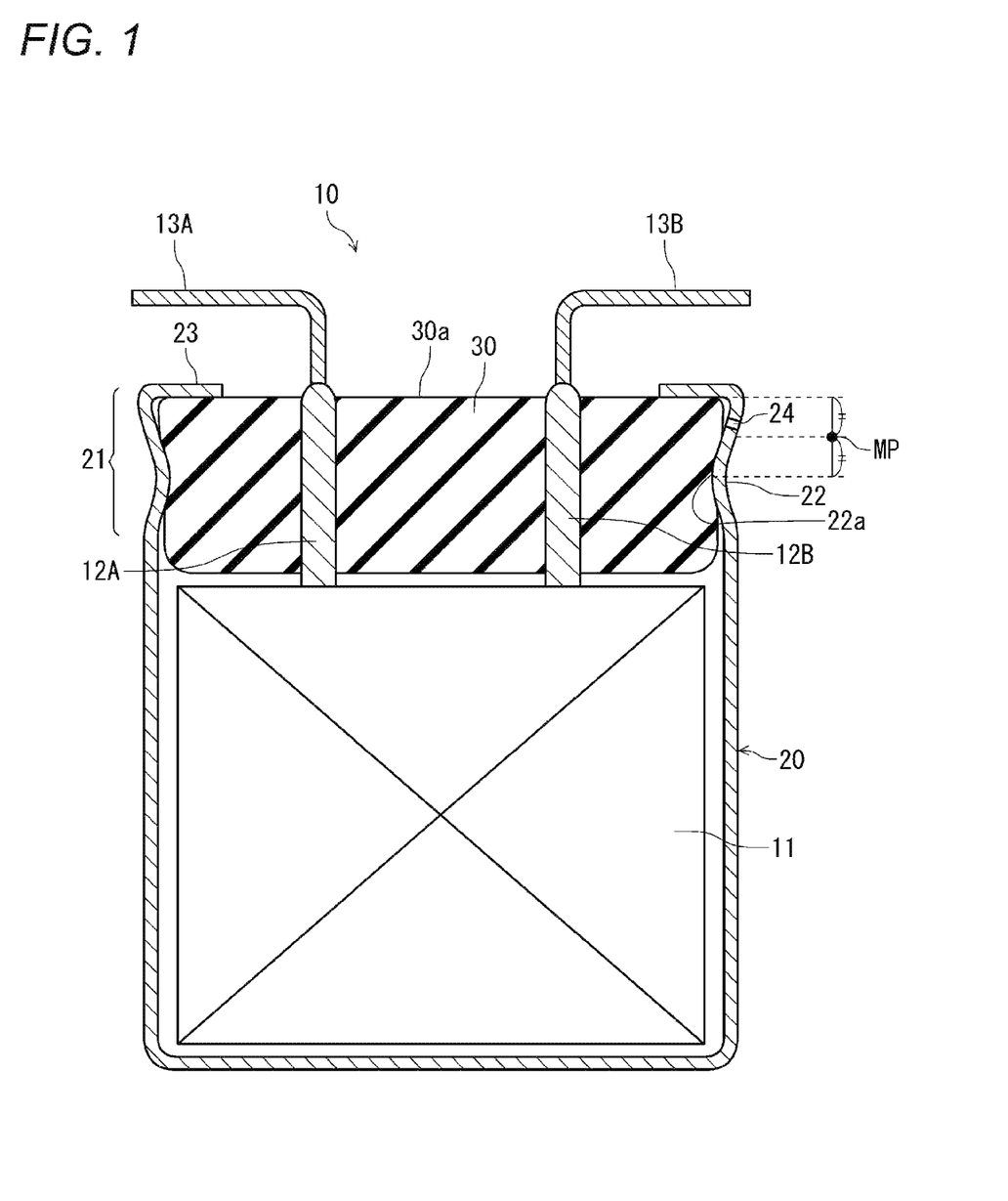
FIG. 1 A schematic cross-sectional view of an example of a power storage device according to Embodiment 1 of the present disclosure, shown in a cross section passing through a through-hole.

Embodiment 1 of the present disclosure will be described. As illustrated in FIG. 1, a power storage device 10 of the present embodiment is constituted as an electrolytic capacitor and includes a power storage element 11, a case 20, and a sealing member 30.

The power storage element 11 includes a wound body. The wound body is formed by winding an anode foil and a cathode foil, with a separator interposed therebetween. To the anode foil and the cathode foil, lead tabs 12A and 12B are connected, respectively, at their one ends. The wound body is constituted by winding together with the lead tabs 12A and 12B. To the other ends of the lead tabs 12A and 12B, lead wires 13A and 13B are connected, respectively.

The case 20 is of a bottomed cylindrical shape and has an opening 21 at one end, and houses the power storage element 11. The case 20 of the present embodiment is constituted of aluminum, but is not limited thereto. The case 20 of the present embodiment is of a bottomed cylindrical shape, but is not limited thereto. The length in the axial length of the case 20, in a state before forming a first pressing portion 22 and a second pressing portion 23 described below, may be, for example, 60 to 80 mm. The outer diameter of the case 20 may be, for example, 16 to 20 mm.

The sealing member 30 seals the opening 21 of the case 20. The sealing member 30 of the present embodiment has a circular plate-like shape, but is not limited thereto. The thickness of the sealing member 30 (the length in the axial direction of the case 20) may be, for example, 3 to 7 mm. The sealing member 30 may be made of an elastic body containing a rubber as a main component. The rubber may constitute 50 mass % or more of the elastic body.

The opening 21 of the case 20 has, in a vicinity of the opening 21, the first pressing portion 22 and the second pressing portion 23, and a through-hole 24 formed between the second pressing portion 23 and the first pressing portion 22. The through-hole 24 is an example of a gas vent portion.

The first pressing portion 22 presses the side surface of the sealing member 30 and protrudes inward of the case 20. The inner diameter of an apex 22a of the first pressing portion 22 is smaller than the outer diameter of the sealing member 30 with no load applied. The first pressing portion 22 of the present embodiment is formed by a grooving process for reducing the diameter of part of the opening 21, but is not limited thereto.

The second pressing portion 23 is disposed nearer to the one end (i.e., nearer to the opening end) of the case 20 than the first pressing portion 22, and presses the rim of the sealing member 30. In other words, the second pressing portion 23, in the vicinity of the opening 21, presses an upper surface 30a of the sealing member 30. The second pressing portion 23 of the present embodiment is formed by curling part of the opening 21, but is not limited thereto.

The through-hole 24 is disposed nearer to the one end of the case 20 (i.e., nearer to the opening end) than the apex 22a of the first pressing portion 22. That is, the through-hole 24 is not disposed at the apex 22a of the first pressing portion 22. The through-hole 24 is disposed, in the axial direction of the case 20, closer to an end surface (upper surface) 30a of the sealing member 30 facing outside of the case 20 than a midpoint MP between the end surface 30a of the sealing member 30 and the apex 22a. Part of the opening 21 located nearer to the opening end than the apex 22a of the first pressing portion 22 may not be partially in contact with the sealing member 30. That is, in a location nearer to the opening end than the apex 22a of the first pressing portion 22, there may be a gap between the inner surface of the opening 21 and the side surface of the sealing member 30. The through-hole 24 of the present embodiment has a circular shape, but is not limited thereto. For example, the through-hole 24 may have a polygonal shape.

The distance from one end of the case 20 before forming the second pressing portion 23 to the center of the through-hole 24 (the distance in the direction parallel to the axial direction of the case 20) may be, for example, 0.25×D to 0.9×D, where D is the distance from one end of the case 20 before forming the second pressing portion 23 to the apex 22a of the first pressing portion 22. The distance D of the present embodiment may be, for example, 2 to 8 mm. The diameter of the through-hole 24 may be, for example, 0.5 to 2 mm.

The through-hole 24 provides communication between the inside and outside of the case 20, when the force acting on the first pressing portion 22 from the sealing member is reduced below a predetermined value due to an increase in the internal pressure of the case 20. On the other hand, when the acting force is equal to or greater than the predetermined value, the through-hole 24 does not provide communication between the inside and outside of the case 20.

Figure 2:
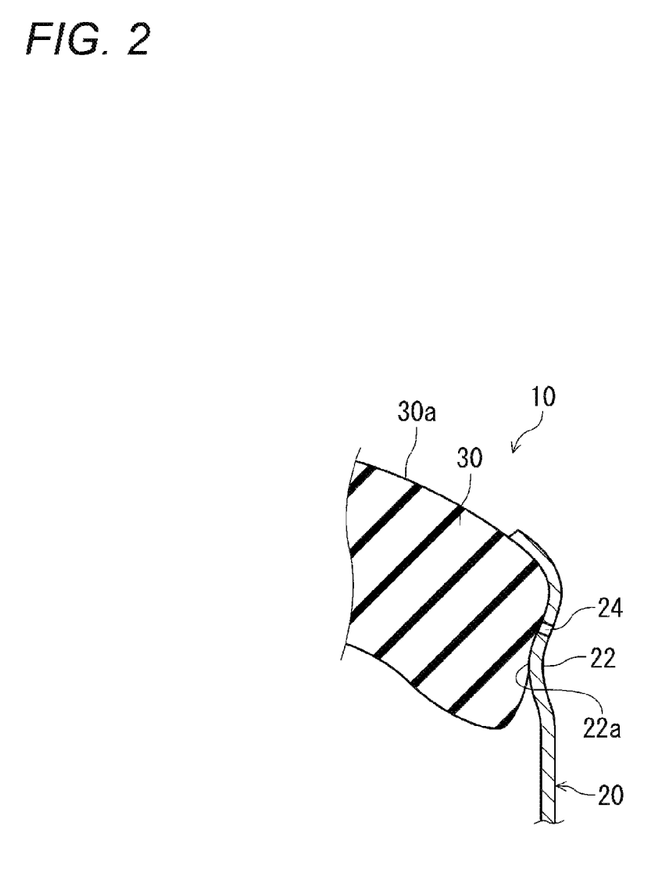
FIG. 2 An enlarged cross-sectional view of an essential part of the power storage device of Embodiment 1 when the internal pressure of a case is increased.

Here, as illustrated in FIG. 2, when the internal pressure of the case 20 is increased, the sealing member 30 expands outward of the case 20 in the axial direction of the case 20. When this axial expansion occurs, the region of the sealing member 30 where it is in contact with the first pressing portion 22 is displaced in a direction away from the first pressing portion 22 (i.e., radially inward), and this weakens the force acting on the first pressing portion 22 from the sealing member 30 (i.e., elastic repulsive force against compression). When the acting force is reduced below a predetermined value, the gas within the case 20 goes through between the sealing member 30 and the first pressing portion 22. This gas can escape through the through-hole 24 from the inside of the case to the outside of the case 20, and thus, the safety of the power storage device 10 can be ensured.

Embodiment 2

Figure 3:
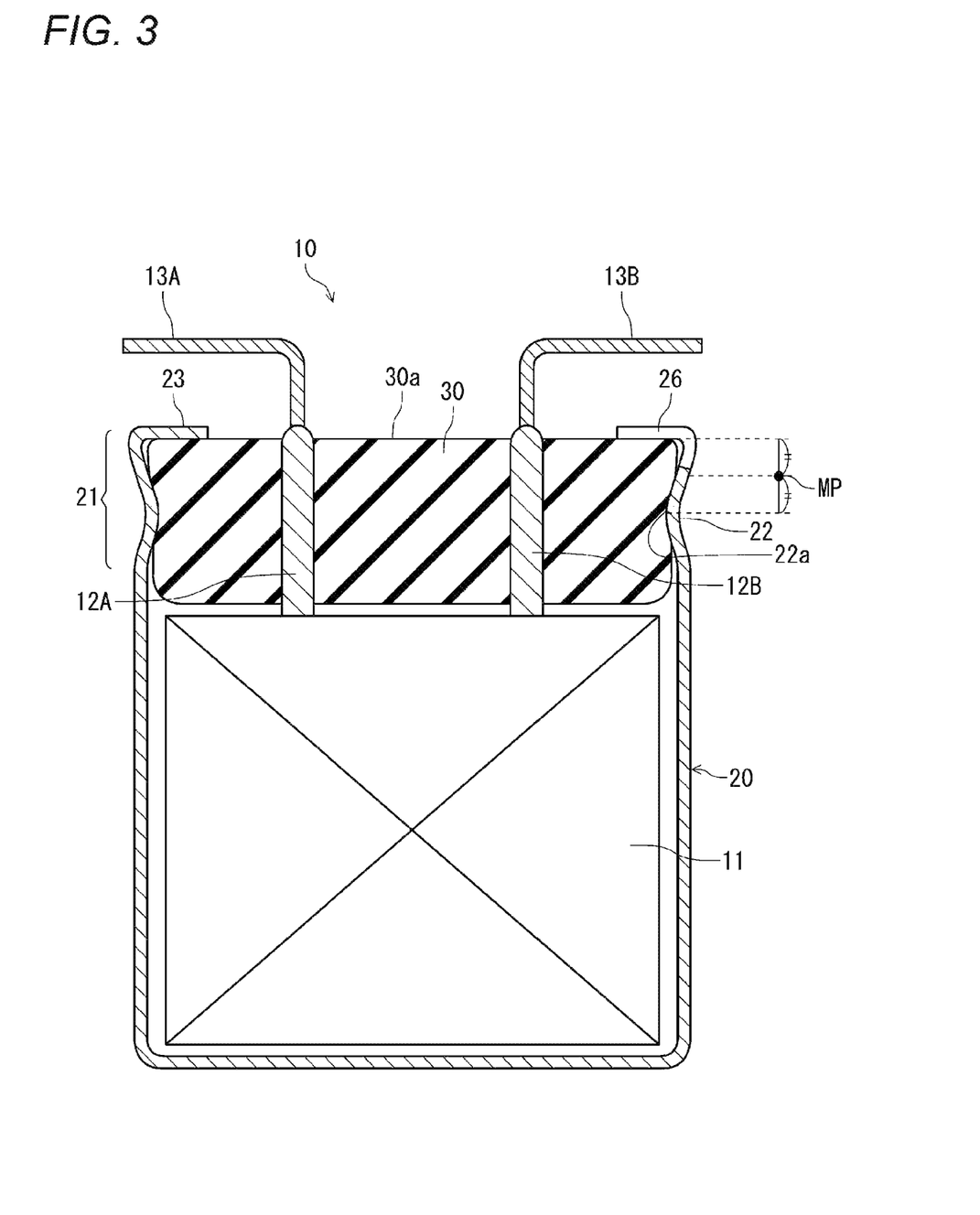
FIG. 3 A schematic cross-sectional view of an example of a power storage device according to Embodiment 2 of the present disclosure, shown in a cross section passing through a slit.

Embodiment 2 of the present disclosure will be described. As illustrated in FIG. 3, a power storage device 10 of the present embodiment is constituted as an electrolytic capacitor and includes a power storage element 11, a case 20, and a sealing member 30.

The power storage element 11 may be as described for the above Embodiment 1.

The case 20 may be as described for the above Embodiment 1.

The sealing member 30 may be as described for the above Embodiment 1.

An opening 21 of the case 20 has a first pressing portion 22, a second pressing portion 23, and a slit 26. The slit 26 is one example of the gas vent portion.

The first pressing portion 22, in a vicinity of the opening 21, presses the side surface of the sealing member 30 and protrudes inward of the case 20. The inner diameter of an apex 22a of the first pressing portion 22 is smaller than the outer diameter of the sealing member 30 with no load applied. The first pressing portion 22 of the present embodiment is formed by a grooving process for reducing the diameter of part of the opening 21, but is not limited thereto.

The second pressing portion 23 is disposed nearer to the one end (i.e., nearer to the opening end) of the case 20 than the first pressing portion 22, and presses the rim of the sealing member 30. In other words, the second pressing portion 23, in the vicinity of the opening 21, presses an upper surface 30a of the sealing member 30. The second pressing portion 23 of the present embodiment is formed by curling part of the opening 21, but is not limited thereto.

The slit 26 is disposed nearer to the one end (i.e., nearer to the opening end) of the case 20 than the apex 22a of the first pressing portion 22. That is, the slit 26 is not disposed at the apex 22a of the first pressing portion 22. The slit 26 is formed from one end of the case 20, to a predetermined position between the one end of the case 20 and the apex 22a of the first pressing portion 22. In the axial direction of the case 20, the tip of the slit 26 is positioned closer to an end surface (upper surface) 30a of the sealing member 30 facing the outside of the case 20 than a midpoint MP between the end surface 30a of the sealing member 30 and the apex 22a of the first pressing portion 22. Part of the opening 21 located nearer to the opening end than the apex 22a of the first pressing portion 22 may not be partially in contact with the sealing member 30. That is, in a location nearer to the opening end than the apex 22a of the first pressing portion 22, there may be a gap between the inner surface of the opening 21 and the side surface of the sealing member 30.

The length of the slit 26 (the length in the direction parallel to the axial direction of the case 20) may be, for example, 0.25×D to 0.9×D, where D is the distance from one end of the case 20 before forming the second pressing portion 23 to the apex 22a of the first pressing portion 22. The distance D of the present embodiment may be, for example, 2 to 8 mm. The width of the slit 26 (the length in the circumferential direction of the case may be, for example, 0.2 to 0.5 mm.

The slit 26 provides communication between the inside and outside of the case when the force acting on the first pressing portion 22 from the sealing member 30 is reduced below a predetermined value due to an increase in the internal pressure of the case 20. On the other hand, when the acting force is equal to or greater than the predetermined value, the slit 26 does not provide communication between the inside and outside of the case 20.

Figure 4:
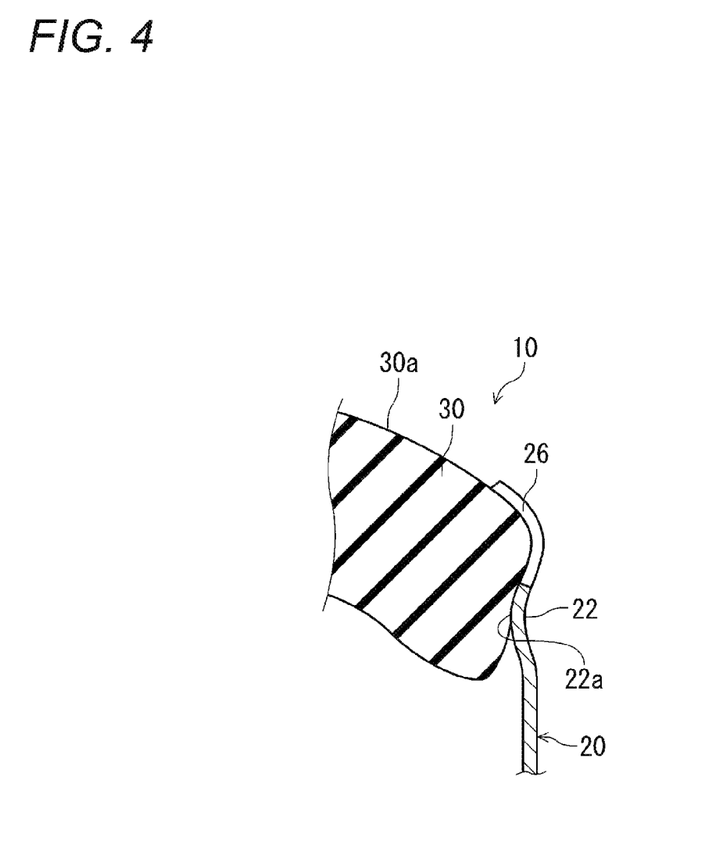
FIG. 4 An enlarged cross-sectional view of an essential part of the power storage device of Embodiment 2 when the internal pressure of a case is increased.

Here, as illustrated in FIG. 4, when the internal pressure of the case 20 is increased, the sealing member 30 expands outward of the case 20 in the axial direction of the case 20. When this axial expansion occurs, the region of the sealing member 30 where it is in contact with the first pressing portion 22 is displaced in a direction away from the first pressing portion 22 (i.e., radially inward), and this weakens the force acting on the first pressing portion 22 from the sealing member 30 (i.e., elastic repulsive force against compression). When the acting force is reduced below a predetermined value, the gas within the case 20 goes through between the sealing member 30 and the first pressing portion 22. This gas can escape through the slit 26 from the inside of the case 20 to the outside of the case 20, and thus, the safety of the power storage device 10 can be ensured.

Embodiment 3

Figure 5:
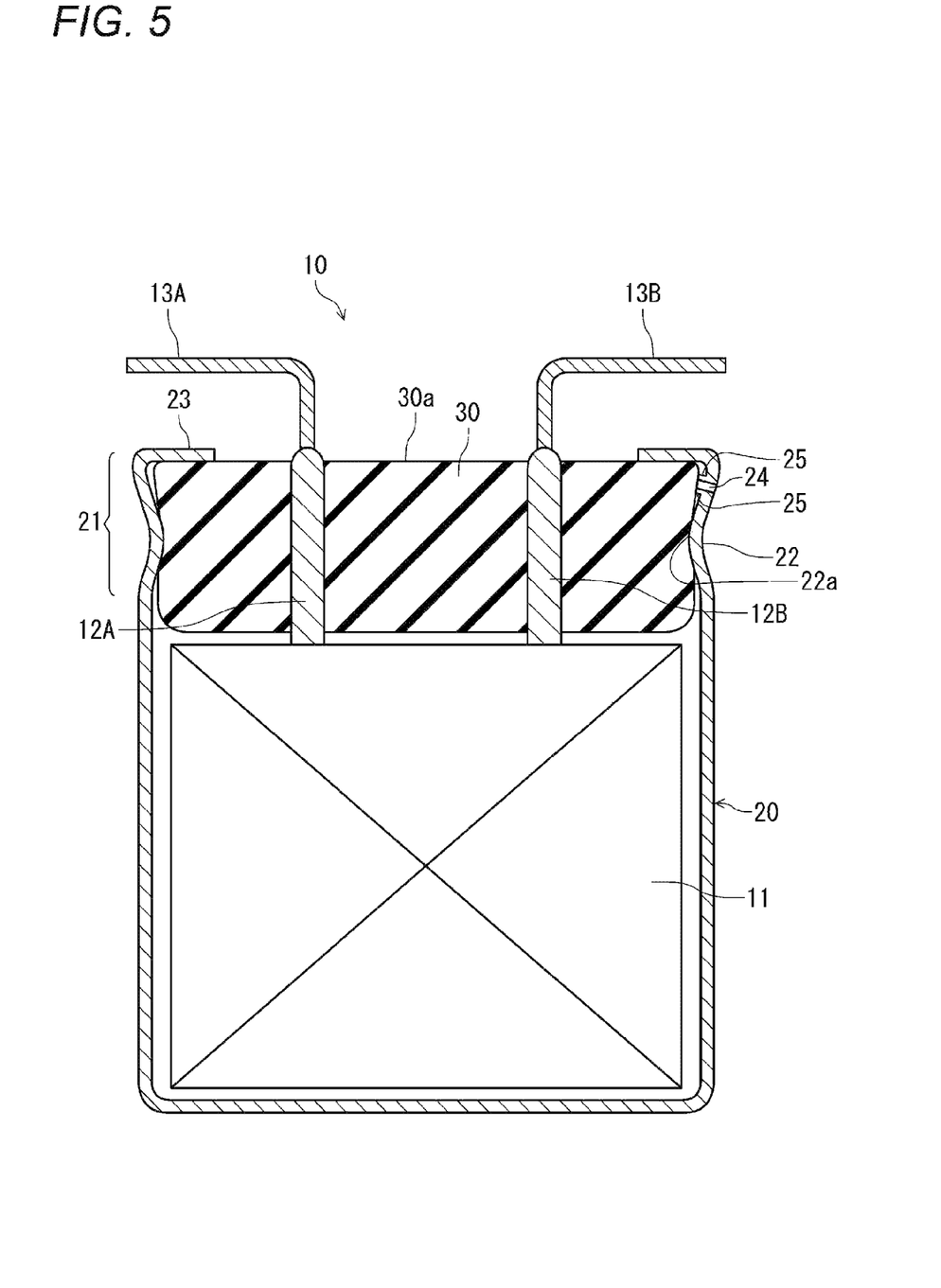
FIG. 5 A schematic cross-sectional view of an example of a power storage device according to Embodiment 3 of the present disclosure, shown in a cross section passing through a through-hole.
Figure 6:
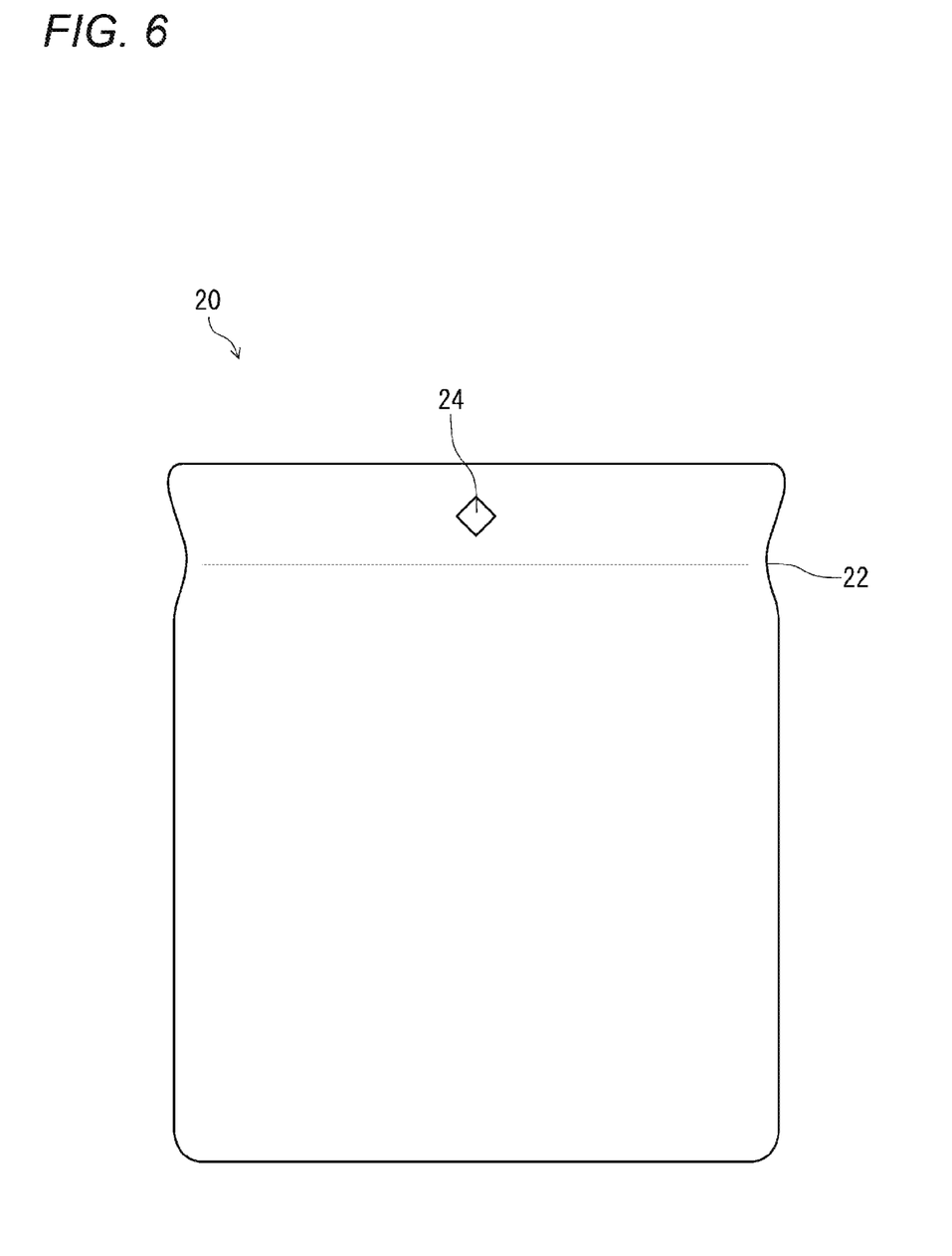
FIG. 6 A schematic side view of a case of the power storage device of Embodiment 3.

Embodiment 3 of the present disclosure will be described. As illustrated in FIGS. 5 and 6, a power storage device 10 of the present embodiment is constituted as an electrolytic capacitor and includes a power storage element 11, a case 20, and a sealing member 30.

The power storage element 11 may be as described for the above Embodiment 1.

The case 20 may be as described for the above Embodiment 1.

The sealing member 30 may be as described for the above Embodiment 1.

An opening 21 of the case 20 has, in a vicinity of the opening 21, a first pressing portion 22 and a second pressing portion 23, and a through-hole 24 formed between the second pressing portion 23 and the first pressing portion 22. The through-hole 24 is one example of the gas vent portion.

The first pressing portion 22 presses the side surface of the sealing member 30 and protrudes inward of the case 20. The inner diameter at an apex 22a of the first pressing portion 22 is smaller than the outer diameter of the sealing member 30 with no load applied. The first pressing portion 22 of the present embodiment may be formed by a grooving process for reducing the diameter of part of the opening 21, but is not limited thereto.

The second pressing portion 23 is disposed nearer to the one end (i.e., nearer to the opening end) of the case 20 than the first pressing portion 22, and presses the rim of the sealing member 30. In other words, the second pressing portion 23, in the vicinity of the opening 21, presses an upper surface 30a of the sealing member 30. The second pressing portion 23 of the present embodiment is formed by curling part of the opening 21, but is not limited thereto.

The through-hole 24 is disposed nearer to the one end (i.e., nearer to the opening end) of the case 20 than the apex 22a of the first pressing portion 22. That is, the through-hole 24 is not disposed at the apex 22a of the first pressing portion 22. Part of the opening 21 located nearer to the opening end than the apex 22a of the first pressing portion 22 may not be partially in contact with the sealing member 30. That is, in a location nearer to the opening end than the apex 22a of the first pressing portion 22, there may be a gap between the inner surface of the opening 21 and the side surface of the sealing member 30. The through-hole 24 of the present embodiment has a square shape, but is not limited thereto. For example, the through-hole 24 may have a circular shape, or may have a polygonal shape other than a square shape.

The distance from one end of the case 20 before forming the second pressing portion 23 to the center of the through-hole 24 (the distance in the direction parallel to the axial direction of the case 20) may be, for example, 0.25×D to 0.9×D, where D is the distance from one end of the case 20 before forming the second pressing portion 23 to the apex 22a of the first pressing portion 22. The distance D of the present embodiment may be, for example, 2 to 8 mm. The diameter of the through-hole 24 (the diameter of the circumscribed circle of the through-hole 24) may be, for example, 0.5 to 2 mm.

The through-hole 24 provides communication between the inside and outside of the case 20, when the force acting on the first pressing portion 22 from the sealing member 30 is reduced below a predetermined value due to an increase in the internal pressure of the case 20. On the other hand, when the acting force is equal to or greater than the predetermined value, the through-hole 24 does not provide communication between the inside and outside of the case 20.

Figure 7:
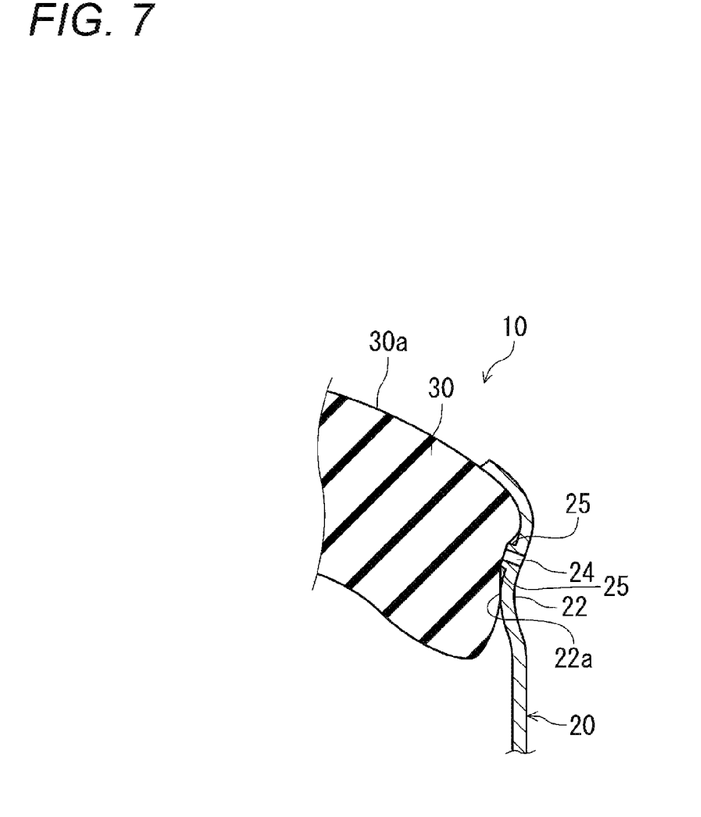
FIG. 7 An enlarged cross-sectional view of an essential part of the power storage device of Embodiment 3 when the internal pressure of the case is increased.

Here, as illustrated in FIG. 7, when the internal pressure of the case 20 is increased, the sealing member 30 expands outward of the case 20 in the axial direction of the case 20. When this axial expansion occurs, the region of the sealing member 30 where it is in contact with the first pressing portion 22 is displaced in a direction away from the first pressing portion 22 (i.e., radially inward), and this weakens the force acting on the first pressing portion 22 from the sealing member 30 (i.e., elastic repulsive force against compression). When the acting force is reduced below a predetermined value, the gas within the case 20 goes through between the sealing member 30 and the first pressing portion 22. This gas can escape through the through-hole 24 from the inside of the case 20 to the outside of the case 20, and thus, the safety of the power storage device 10 can be ensured.

As illustrated in FIGS. 5 and 6, the power storage device 10 has a protrusion 25 protruding inward of the case 20 on the periphery of the through-hole 24. In the present embodiment, four projections 25 each having a triangular shape are formed along respective sides of the square through-hole 24. Each protrusion 25 has a width that narrows from the base end toward the tip end. Therefore, the protruding end of the protrusion 25 is not continuous over the entire circumference of the through-hole 24. Each projection 25 may be formed, along with when the through-hole 24 is formed in the case 20.

The presence of the protrusion 25 prevents the through-hole 24 from being clogged by the sealing member 30. That is, even when the sealing member 30 is deformed and approaches the through-hole 24, the projection 25 abuts against the side surface of the sealing member 30, to prevent the through-hole 24 from being completely clogged (see, for example, FIG. 7).

(Method for Manufacturing Power Storage Device)

A method for manufacturing the above-described power storage device 10 will be described below. The manufacturing method includes a housing step, a sealing preparation step, a sealing completion step, and a piercing step.

In the housing step, a power storage element 11 is housed in a case 20. In the present embodiment, the power storage device 10 is an electrolytic capacitor. A wound body included in the power storage element 11 is housed in the case 20 such that the axial direction of the wound body substantially coincides with the axial direction of the case 20.

In the sealing preparation step, a sealing member 30 is disposed at an opening 21 of the case 20. The sealing member 30 may be disposed so as to be in contact with the inner surface of the case 20 or may be disposed so as not to be in contact with the inner surface of the case 20.

In the sealing completion step, a first pressing portion 22 and a second pressing portion 23 are formed. The first pressing portion 22 is formed by a grooving process for reducing the diameter of part of the opening 21. The second pressing portion 23 is formed by curling part of the opening 21. In the present embodiment, the formation of the first pressing portion 22 is started first, and during the formation thereof, the formation of the second pressing portion 23 is started. Thus, the opening 21 of the case 20 is sealed.

Figure 8:
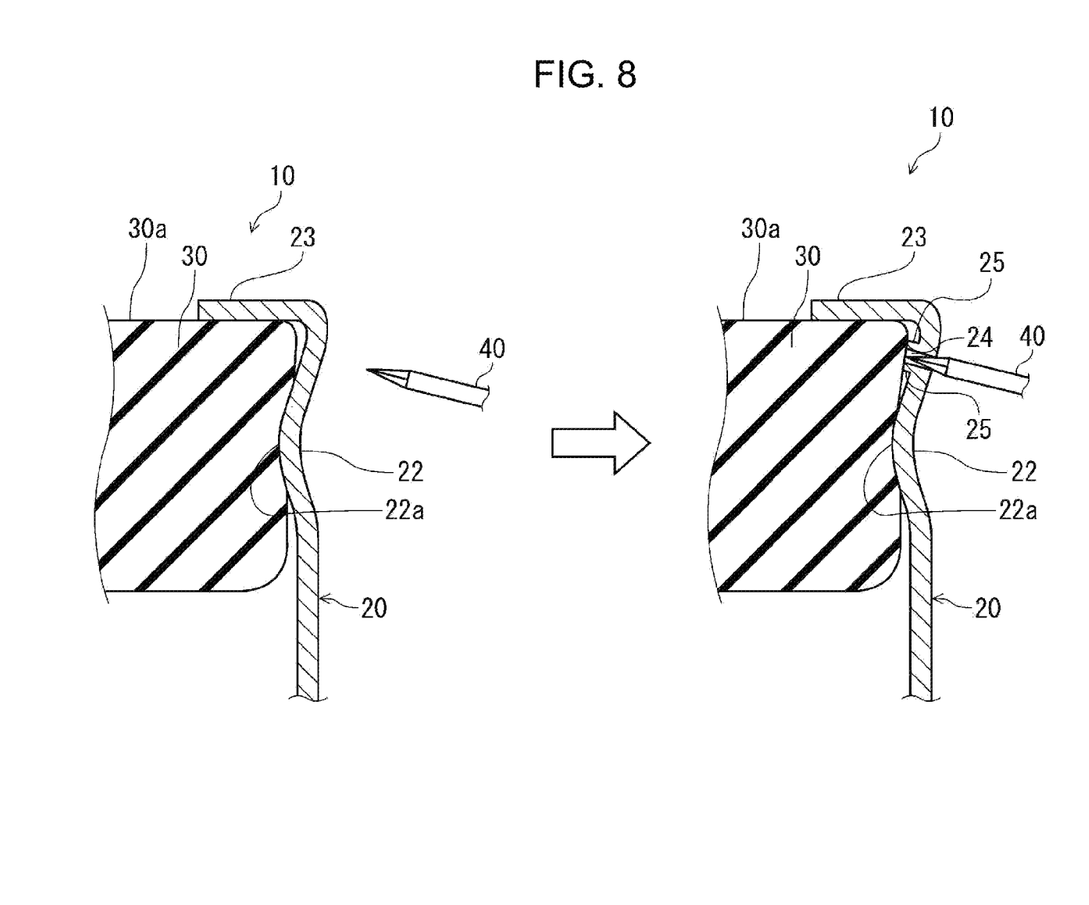
FIG. 8 A set of enlarged cross-sectional views for explaining a piercing step of a method for manufacturing the power storage device of Embodiment 3.

The piercing step is performed after the sealing completion step. In the piercing step, a through-hole 24 and a projection 25 are formed between the first pressing portion 22 and the second pressing portion 23 in the case 20. In the piercing step of the present embodiment, as illustrated in FIG. 8, the through-hole 24 is formed by piercing the case 20 with the tip of a needle 40. The tip of the needle 40 has a quadrangular pyramid shape. The needle 40 is an example of a tool with a sharp point.

EXAMPLES

With respect to power storage devices 10 of Examples 1 to 5 and Comparative Example 1 shown below, the relationship between the position of a through-hole 24 and the operating pressure of the explosion-proof mechanism was measured. Here, the operating pressure of the explosion-proof mechanism refers to an internal pressure of a case 20 at the time when, with increase in the internal pressure of the case 20, the inside and outside of the case 20 become communicated with each other via the through-hole 24. The power storage devices 10 of Examples 1 to 5 correspond to the above Embodiment 1.

Example 1

The outer diameter of the case 20 made of aluminum was set to 18 mm. The axial length of the case 20 before forming the first pressing portion 22 and the second pressing portion 23 was set to 70 mm, and the distance from one end of the case 20 before forming the second pressing portion 23 to an apex 22a of the first pressing portion 22 was set to 4.5 mm. The thickness of the sealing member 30 made of butyl rubber was set to 5 mm, and the outer diameter of the sealing body 30 before compression was set to 17.1 mm. The diameter of the through-hole 24 was set to 1 mm, and the distance from one end of the case 20 before forming the second pressing portion 23 to the center of the through-hole 24 (hereinafter, simply, the "distance to the through-hole 24") was set to 1.1 mm. The operating pressure of the explosion-proof mechanism was 2.06 MPa.

Example 2

The distance to the through-hole 24 was set to 1.73 mm, and other configurations except this were set the same as those in Example 1. The operating pressure of the explosion-proof mechanism was 2.07 MPa.

Example 3

The distance to the through-hole 24 was set to 2.22 mm, and other configurations except this were set the same as those in Example 1. The operating pressure of the explosion-proof mechanism was 2.04 MPa.

Example 4

The distance to the through-hole 24 was set to 2.59 mm, and other configurations except this were set the same as those in Example 1. The operating pressure of the explosion-proof mechanism was 2.04 MPa.

Example 5

The distance to the through-hole 24 was set to 3.33 mm, and other configurations except this were set the same as those in Example 1. The operating pressure of the explosion-proof mechanism was 2.06 MPa.

Comparative Example 1

The distance to the through-hole 24 was set to 4.26 mm, and other configurations except this were set the same as those in Example 1. Specifically, the through-hole 24 was formed such that part of it was positioned closer to the other end of the case 20 than the apex 22a of the first pressing portion 22. The operating pressure of the explosion-proof mechanism was 1.12 MPa.

As described above, between Examples 1 to 5 and Comparative Example 1, a difference of approximately two times was observed in the operating pressure of the explosion-proof mechanism. Moreover, in Examples 1 to 5, the operating pressure of the explosion-proof mechanism was substantially constant. A higher operating pressure of the explosion-proof mechanism is preferable as long as a desired operation can be obtained. It can be said therefore that the superiority of Examples 1 to 5 was demonstrated.

Furthermore, with respect to power storage devices 10 of Examples 6 to 9 and Comparative Example 2 shown below, the relationship between the length of the slit 26 and the operating pressure of the explosion-proof mechanism was measured. Here, the operating pressure of the explosion-proof mechanism refers to an internal pressure of the case 20 at the time when, with increase in the internal pressure of the case 20, the inside and outside of the case 20 become communicated with each other via the slit 26. The power storage devices 10 of Examples 6 to 9 correspond to the above Embodiment 2.

Example 6

The outer diameter of the case 20 made of aluminum was set to 18 mm. The axial length of the case 20 before forming the first pressing portion 22 and the second pressing portion 23 was set to 70 mm, and the distance from one end of the case 20 before forming the second pressing portion 23 to an apex 22a of the first pressing portion 22 was set to 4.5 mm. The thickness of the sealing member 30 made of butyl rubber was set to 5 mm, and the outer diameter of the sealing body 30 before compression was set to 17.1 mm The width of the slit 26 was set to 0.3 mm, and the length of the slit 26 was set to 1 mm. The operating pressure of the explosion-proof mechanism was 1.98 MPa.

Example 7

The length of the slit 26 was set to 2 mm, and other configurations except this were set the same as those in Example 6. The operating pressure of the explosion-proof mechanism was 1.87 MPa.

Example 8

The length of the slit 26 was set to 3 mm, and other configurations except this were set the same as those in Example 6. The operating pressure of the explosion-proof mechanism was 1.66 MPa.

Example 9

The length of the slit 26 was set to 4 mm, and other configurations except this were set the same as those in Example 6. The operating pressure of the explosion-proof mechanism was 1.58 MPa.

Example 10

The length of the slit 26 was set to 5 mm, and other configurations except this were set the same as those in Example 6. The operating pressure of the explosion-proof mechanism was 0.15 MPa.

As described above, between Examples 6 to 9 and Comparative Example 2, a difference of approximately one order was observed in the operating pressure of the explosion-proof mechanism. A higher operating pressure of the explosion-proof mechanism is preferable as long as a desired operation can be obtained. It can be said therefore that the superiority of Examples 6 to 9 was demonstrated.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The present disclosure is applicable to a power storage device, and a method for manufacturing a power storage device.

[Reference Signs List]

10: power storage device
11: power storage element
12A, 12B: lead tab
13A, 13B: lead wire
20: case
　21: opening
　　22: first pressing portion
　　　22a: apex
　　23: second pressing portion
　　24: through-hole (gas vent portion)
　　25: protrusion
　　26: slit (gas vent portion)
30: sealing member
　30a: end surface (upper surface)
40: needle (tool)
MP: midpoint

The invention claimed is:

1. A power storage device, comprising:
a power storage element;
a case with a bottomed cylindrical shape having an opening at one end and housing the power storage element; and
a sealing member for sealing the opening, wherein
the case has,
in a vicinity of the opening, a first pressing portion pressing a side surface of the sealing member and protruding inward of the case, and
a gas vent portion disposed nearer to the one end than an apex which is the most protruded point of the first pressing portion.

2. The power storage device according to claim 1, wherein the gas vent portion has a through-hole.

3. The power storage device according to claim 2, wherein the through-hole is disposed, in an axial direction of the case, closer to an upper surface of the sealing member than a midpoint between the upper surface of the sealing member and the apex which is the most protruded point of the first pressing portion.

4. The power storage device according to claim 2 or 3, wherein the through-hole has a circular or oval shape.

5. The power storage device according to claim 2 or 3, wherein the through-hole has a polygonal shape.

6. The power storage device according to claim 1, wherein the case further has, in the vicinity of the opening, a second pressing portion pressing an upper surface of the sealing member.

7. The power storage device according to claim 6, wherein the gas vent portion is disposed between the first pressing portion and the second pressing portion in the case.

8. The power storage device according to claim 1, wherein the gas vent portion has a slit.

9. The power storage device according to claim 8, wherein the slit is not disposed at the apex.

10. The power storage device according to claim 8, wherein the sealing member comprises an elastic material mainly composed of a rubber.

11. The power storage device according to claim 8, wherein the case further includes, in the vicinity of the opening, a second pressing portion pressing an upper surface of the sealing member.

12. The power storage device according to claim 8, wherein the slit extends to the one end of the case.

13. The power storage device according to claim 1, wherein
the gas venting portion has a through-hole, and a protrusion protruding inward of the case is formed on a periphery of the through-hole.

14. The power storage device according to claim 13, wherein
the through-hole has a polygonal shape, and
the protrusion is formed along each side of the polygon shape.

15. The power storage device according to claim 13, wherein the case further includes, in the vicinity of the opening, a second pressing portion pressing an upper surface of the sealing member.

16. The power storage device according to claim 15, wherein the gas vent portion is disposed between the first pressing portion and the second pressing portion in the case.

17. A method for manufacturing a power storage device, the method for manufacturing the power storage device of claim 13, and the method comprising:
a piercing step of forming the through-hole by piercing the case with a tip of a tool with a sharp point.

18. The method for manufacturing a power storage device claim 17, wherein the tip of the tool is polygonal pyramid-shaped.

19. A method for manufacturing a power storage device, the method for manufacturing the power storage device of claim 15, and the method comprising:
a housing step of housing the power storage element in the case;
a sealing preparation step of disposing the sealing member at the opening;
a sealing completion step of forming the first pressing portion and the second pressing portion; and
a piercing step of forming the through-hole and the protrusion between the first pressing portion and the second pressing portion in the case, after the sealing completion step.

* * * * *